(12) United States Patent
Tiefnig

(10) Patent No.: US 10,044,218 B2
(45) Date of Patent: Aug. 7, 2018

(54) MICRO-ENERGY HARVESTER FOR BATTERY FREE APPLICATIONS

(71) Applicant: Eugen Tiefnig, Berg im Drautal (AT)

(72) Inventor: Eugen Tiefnig, Berg im Drautal (AT)

(*) Notice: Subject to any disclaimer, the term of this patent is extended or adjusted under 35 U.S.C. 154(b) by 35 days.

(21) Appl. No.: 14/937,614

(22) Filed: Nov. 10, 2015

(65) Prior Publication Data

US 2017/0133938 A1 May 11, 2017

(51) Int. Cl.
*H02M 3/338* (2006.01)
*H02J 7/35* (2006.01)
*H02J 7/34* (2006.01)

(52) U.S. Cl.
CPC .............. *H02J 7/35* (2013.01); *H02J 7/345* (2013.01)

(58) Field of Classification Search
CPC ...... H02M 3/325; H02M 3/335; H02M 3/338; H02M 3/3381; H02M 3/3385
See application file for complete search history.

(56) References Cited

U.S. PATENT DOCUMENTS

| | | | |
|---|---|---|---|
| 4,274,044 A | 6/1981 | Barre | |
| 4,757,433 A * | 7/1988 | Santelmann, Jr. | ..... H04N 3/185 |
| | | | 331/117 FE |
| 5,276,393 A | 1/1994 | Gali | |
| 5,288,336 A * | 2/1994 | Strachan | ................. H01L 35/32 |
| | | | 136/200 |
| 6,340,787 B1 * | 1/2002 | Simeray | ................. G04C 10/00 |
| | | | 136/201 |
| 7,449,866 B2 | 11/2008 | Kanai | |
| 8,411,467 B2 | 4/2013 | Rubio | |
| 8,531,152 B2 | 9/2013 | Blau | |
| 8,658,881 B2 * | 2/2014 | Cheng | ..................... H01L 35/00 |
| | | | 136/205 |
| 2005/0041437 A1 | 2/2005 | Chian | |
| 2005/0146220 A1 * | 7/2005 | Hamel | ................ B60C 23/0411 |
| | | | 307/44 |
| 2009/0196041 A1 | 8/2009 | Joseph | |
| 2010/0060231 A1 | 3/2010 | Trainor | |
| 2010/0328972 A1 | 12/2010 | Pollak | |
| 2011/0221416 A1 | 9/2011 | Ivanov | |
| 2012/0313612 A1 * | 12/2012 | Schneider | ................. G05F 1/67 |
| | | | 323/311 |
| 2013/0182464 A1 | 7/2013 | Woias | |

* cited by examiner

*Primary Examiner* — Gary L Laxton

(57) ABSTRACT

A micro-energy harvester that receives an input direct current (DC) voltage from a micro-energy source. The micro-energy harvester includes an oscillator and builds up the input DC voltage into an output DC voltage, where the oscillator includes a transistor that is configured to be normally off and the transistor is configured to be switched on by the micro-energy source. The micro-energy harvester outputs the output DC voltage to a micro-energy application. The micro-energy application and the micro-energy harvester are both configured to operate without a battery. The micro-energy harvester also includes an integrated power manager that provides a complete solution for transforming and storing electrical energy from micro-energy power sources to efficiently power applications that do not require continuous power.

16 Claims, 4 Drawing Sheets

MICRO-ENERGY HARVESTER FOR BATTERY FREE APPLICATIONS

BACKGROUND OF THE INVENTION

1. Field of Invention

The invention relates generally to micro-energy harvesters, and more particularly, to an improved micro-energy harvester that works with a lower input power source and works at a higher efficiency.

2. Description of Related Art

Energy harvesting, also known as power harvesting or energy scavenging, is the process by which energy is input from external input sources (e.g. solar power converting ambient energy into electrical energy, thermal energy, wind energy, salinity gradients, and kinetic energy) that are captured, built up, and stored for and delivered to small, wireless autonomous applications, like those used in wearable electronics and wireless sensor networks.

A micro-energy source has very low power, which is fed into a micro-energy harvester. Micro-energy sources include environmental low energy DC or AC power generators and anything else that can output a low DC or AC power to a micro-energy harvester. Energy harvesters are typically powered by photo cells, piezoelectric transducers or a thermoelectric generator.

A micro-energy harvester contains circuitry conversion for energy and storage from the micro-energy source. The micro-energy harvester may at times be broadly referred to as a type of energy converter. Energy converters convert radiation, kinetic and thermal energy to electrical energy, where the conversion can be to alternating current (AC) or to direct current (DC).

The electrical equivalent of the input energy that a micro-energy harvester receives is in most cases below the thresholds of electronics and would not be useful absent the micro-energy harvester. For example, a supply voltage of less than 0.7 Volt at an input of a transistor or diode is below the threshold that a transistor or diode needs to be turned on, and therefore would not be useful absent some form of transformation. A typical conventional micro-energy source is much lower (e.g., millivolts, milliamps, microamps), where power is mathematically equal to voltage multiplied by current. The constant output power that the micro-energy harvester can deliver is typically very small, but since energy can be built up in its storage element over time, an application circuit can be driven in burst mode (e.g. discontinuous mode or duty cycle mode).

A micro-energy application receives the output power built up over time by the micro-energy harvester. Because the output power is built up over time, it is important that the micro-energy application does not require "continuous" power. Thus, micro-energy applications currently do not include cell phones, laptops, or other devices requiring a battery or conventional power supplies because these applications require continuous power. The micro-energy application can be referred to as a battery free application for low-energy electronics. Similarly stated, micro-energy applications include duty cycle devices, where duty cycle devices are not always on. Duty cycle devices harvest energy for a while until they have sufficient energy, and then they execute a task. In other words, a micro-energy harvester never powers a device continuously; it is always a duty cycle.

A problem with conventional micro-energy harvesters is that they require more operating power than some micro-energy sources can provide. For example, many conventional micro-energy harvesters require more input power than a solar cell under artificial illumination can provide. Given that power is mathematically equal to voltage multiplied by current, this problem can alternatively be stated as conventional micro-energy harvesters requiring too much current and/or voltage. As a result, conventional micro-energy harvesters receive input energy from large energy converters like solar panels, thermoelectric and piezoelectric generators.

Another problem with conventional micro-energy harvesters is that they have low conversion efficiency. The main reason for this low conversion efficiency is that conventional resonant step-up converters use high turn ratios for the inductor to achieve the required output voltage. Usually self-starting circuits are on at start-up, since there is no human interaction or high operating voltage to start the circuit. Normally-on circuits draw high input current at start-up, making it impossible to use weak energy sources like small solar cells. Normally on means that the transistors of the conventional micro-energy harvester are on to begin with, that is, when the micro-energy source input is at 0 volts (and 0 volts at the transistor's gate). This problem exists because, prior to embodiments disclosed in this application, no one has discovered an improved micro-energy harvester with circuitry that can switch on when normally off (that is, turn it on when it is not already on to start with).

A further problem with conventional micro-energy harvesters is that they are not a complete solution. Conventional micro-energy harvesters lack circuitry that allows them to charge a storage element like a small rechargeable battery or super capacitor. Another problem with most conventional micro-energy harvesters is that they do not contain circuitry for their state of charge, which requires a power supervisory circuit.

A conventional micro-energy harvester is shown in U.S. Pat. Pub. No. 2010/0328972 to Pollak et al. Pollak discloses a voltage converter circuit which includes an energy storage and a switch arrangement, wherein the switch arrangement has a first switch and a second switch, where the first switch of the switch arrangement has a smaller turn-on voltage according to amount than the second switch. However, Pollak's smaller turn on voltage still requires a large input current (and thus a larger startup power), has no circuit for charging an energy storage element and no power supervisory function.

SUMMARY OF THE INVENTION

The present invention provides, in at least one embodiment, a micro-energy harvester with an integrated power manager that provides a complete solution for transforming and storing electrical energy from micro-energy sources to efficiently power applications that do not require continuous power.

An advantage of the present invention is the micro-energy harvester works with very low power sources, for example, as low as 100 nanowatts. This is achieved by an inductor in series with a normally off transistor as part, or also referred to as, an oscillator to slowly bring the input voltage at the transistor to a voltage threshold to turn the transistor on (e.g., about 100 millivolts), where 60 millivolts from a micro-energy source plus an induced voltage (e.g., 40 millivolts) at the input gives the threshold voltage required to start up (i.e., switch on) a transistor. The micro-energy harvester works with weak energy sources, such as a small (2 cm$^2$) solar cell. The micro-energy harvester uses the drain to source leakage current from its input transistor at zero gate voltage to initiate oscillation at startup. After a few oscillations with the gate voltage amplitude steadily increasing, the drain source resistance reaches its on state value and current from the micro-energy source can flow. This method prevents the output voltage from a weak micro-energy source from collapsing due to excessive current draws at oscillator startup.

Other micro-energy harvesters use a J-FET as their input transistor, which is on at zero gate voltage. This means that at the moment an input source is connected, current can flow and, without oscillation, a large current will pass through the inductor, initially collapsing the source voltage. In the current invention, a different circuit topology is used with a MOSFET type of pass transistor, avoiding large startup current draws from weak energy sources and, at the same time, matching the internal resistance of weak energy sources for a more efficient conversion.

Another advantage of the present invention is the tight internal resistance matching with weak energy sources like solar cells at low light levels, which increases conversion efficiency at low light levels. The presented micro-energy harvester achieves conversion efficiencies up to 50% at low light levels which increase to 60% in bright sun light, compared to the approximately 20 to 30% efficiency for conventional micro-energy harvesters.

A further advantage of the present invention is that it is a complete and simple solution providing a unique conversion circuit combined with a charging and energy supervisory circuit. The power supervisor (manager) automatically starts up the application circuit once sufficient energy has accumulated, and shuts it down in case the working voltage is too low.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows.

DETAILED DESCRIPTION OF EMBODIMENTS

Figure 1:
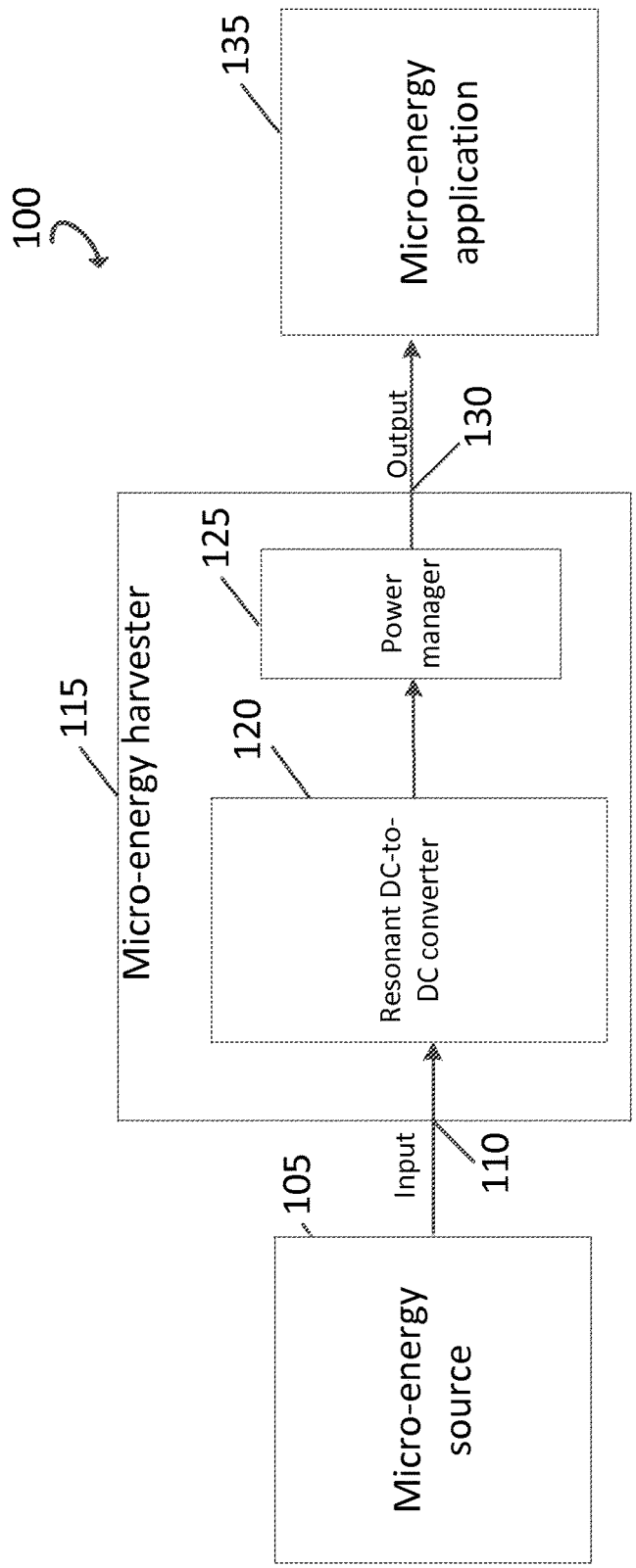
FIG. 1 illustrates a view of a system according to an embodiment of the invention.

Further features and advantages of the invention, as well as the structure and operation of various embodiments of the invention, are described in detail below with reference to the accompanying FIGS. 1-5, wherein like reference numerals refer to like elements.

Although the micro-energy harvester is at times illustrated and described as being separate from the micro-energy source, the power manager, and micro-energy application, in some embodiments all of these are together on one circuit board. Additionally, although the invention is at times described and illustrated as working with a particular micro-energy source as the input power, such as a solar cell, the micro-energy harvester can work with other micro-energy input power source in other embodiments (e.g., a thermo-electric generator).

Embodiments of the present invention provide an electronic circuit to harvest and store energy from micro-energy sources such as small solar cells or other environmental low energy DC power generators. DC micro-energy harvesters receive a low output voltage that has to be transformed to become a suitable power supply for an application circuit. The presented harvester, which may be referred to as a resonant DC-DC converter or an oscillator, can start operation at 60 mV input voltage (e.g., 60-500 millivolts) with a start-up power of less than 100 nanowatts.

A simple cost-effective power manager is also implemented with an operating current of less than 2 microamps. The harvester circuit reaches an efficiency of 55-60%. As a practical micro-energy application, a battery-free wireless floating tank-level switch incorporating the solar micro-energy harvester has been built and tested. With a built-in super capacitor fully charged, the presented device design allows for energy-autarkic operation and can survive fully functional in complete darkness for one week.

FIG. 1 illustrates a view of a system 100 according to an embodiment of the invention. The system 100 includes a micro-energy source 105, an input 110 to a micro-energy harvester 115 with a resonant DC-to-DC converter 120 with a self starting oscillator, and a power manager 125, and an output 130 into a micro-energy application 135. The system 100 (e.g., micro-energy harvesting system) builds up DC-to-DC power from a low power solar input power 105 from a non-continuous power source.

The micro-energy source 105 is a conventional input known by one with skill in the art. The micro-energy source 105 produces a low DC power that is so small that it in of itself cannot power any device absent a power converter. The micro-energy source is not a "continuous" power source such as a battery, power supply, or any other continuous foreign power source.

The micro-energy harvester 115 (also referred to as a "device") accumulates energy over a certain time period by receiving a low amount of power at the input 110 from the micro-energy source 105. The micro-energy harvester 115 slowly accumulates electrical energy over time and then outputs it to the micro-energy application 135.

The resonant DC-to-DC converter 120 transforms and accumulates the input energy. Micro-energy harvesters are sometimes referred to as a DC-to-DC voltage converter, as micro-energy harvesters use a "resonant" DC-to-DC voltage converter to increase the input voltage. Self-starting resonant DC-to-DC voltage converters are "battery free" DC-to-DC voltage converters as most DC-to-DC converters continuously require a battery (or some other form of continuous external power) and simply convert an input source of DC from one voltage level to another voltage level. Resonance occurs when a system is able to store and easily transfer energy between two or more different storage modes and there are some losses from cycle to cycle, called damping.

Figure 3:
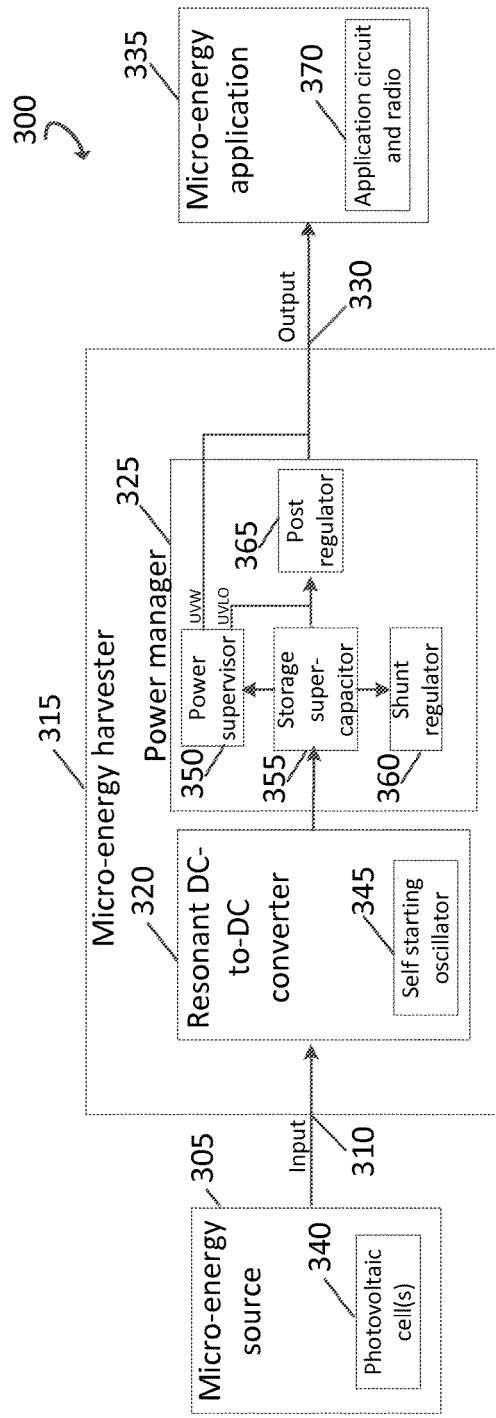
FIG. 3 illustrates a more detailed view of the system according to an embodiment of the invention.
Figure 4:
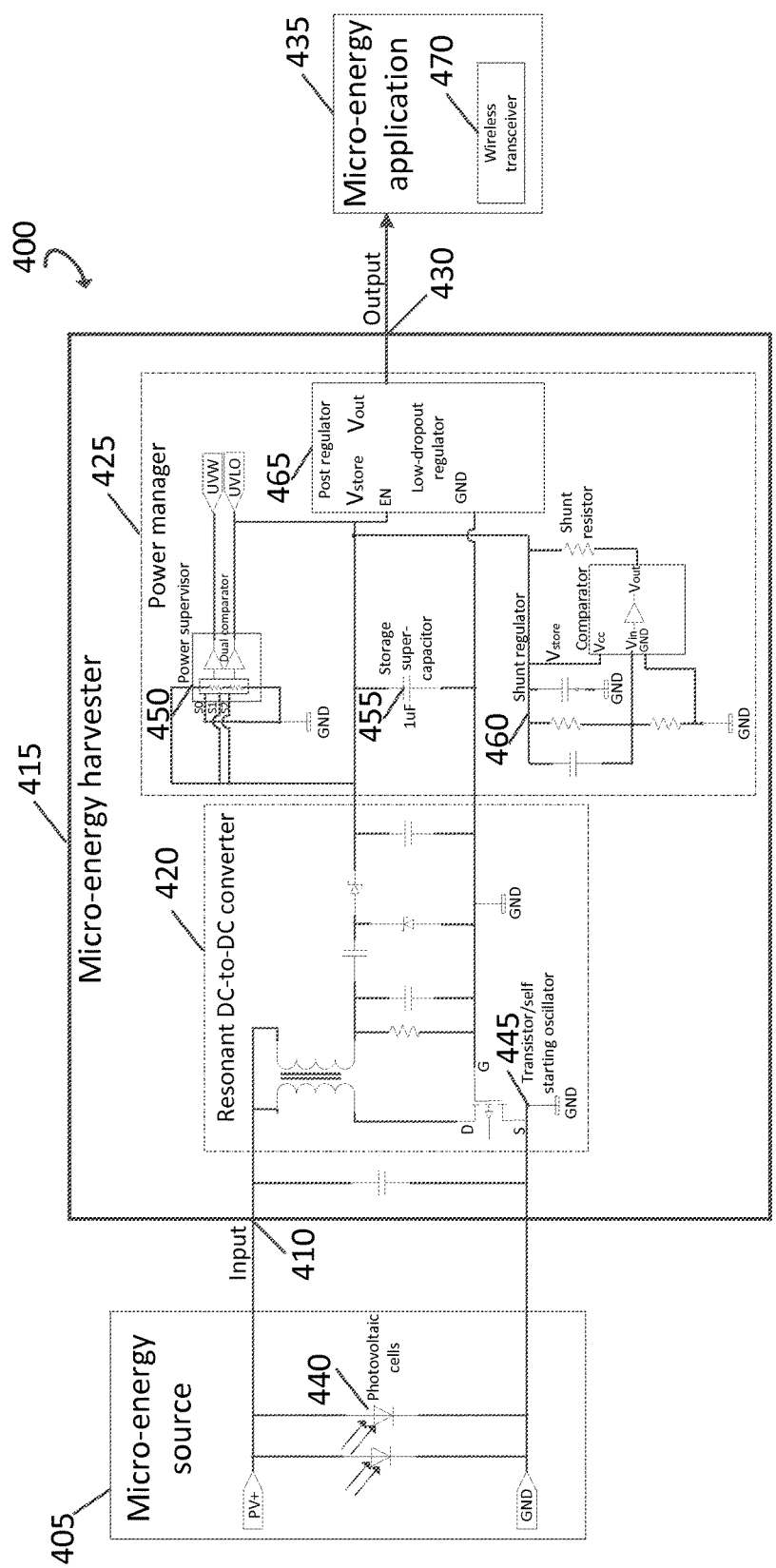
FIG. 4 illustrates exemplary circuitry of the system according to an embodiment of the invention.

The power manager 125 provides improved circuitry such as a power supervisor, a storage super capacitor (e.g., a charger, 1F cap, etc.), and a shunt regulator discussed further in FIGS. 3-4. In one embodiment, the power manager 125 is part of the same chip as the micro-energy harvester 115 creating a complete solution because conventional micro-energy harvesters do not provide stable outputs.

The micro-energy application 135 (also referred to as a micro-powered battery-free application) receives power from the output 130. The micro-energy application 135 can be any electric device known in the art that can operate discontinuously, that is with a duty cycle and without a battery, such as a wireless transceiver. The micro-energy application 135 is discontinuous because the micro-energy harvester must charge up, and also because the micro-energy source is not continuous (e.g., light from the sun, temperature differences, vibration, etc.). Another advantage of harvesters is they eliminate the need for a cable. As such, most micro-energy applications 135 are wireless.

The micro-energy harvester 115 and power manager 125 provide an economic solution to power management tasks in harvesting power supplies and is designed around four building blocks: a self-starting DC to DC converter to transform transducer voltage levels to a useable form; a managing power for energy storage units like capacitors, super capacitors or rechargeable micro-batteries; supplying a regulated continuous voltage to the application circuit independent of source or load variations; and managing application power usage through software.

The power consumption of electronic circuits and systems is decreasing more and more, and with the help of software controlled duty cycles, the average power consumption of electronic systems can be further optimized. Thus, energy from the environment such as light, heat, motion, ambient electromagnetic radiation (RF) and fuel cells can be used to supply electronic devices. Typical devices are sensors and wireless transceivers for home automation and industrial controls. Every ambient energy source (e.g., light, vibrations, thermal) has its own requirement and challenge, which the user has to cope with. For example, light has a challenge of small surface area and low light levels, vibration has a challenge of variability of vibration, and thermal has a challenge of small thermal gradients. The estimated power in 1 centimeter or square centimeter is 1 microwatt to 15 milliwatts for light; 1-200 microwatts for vibrations, and about 15 microwatts for thermal.

This means that small ambient energy harvesting transducers can only provide microwatts to milliwatts of power and, in most cases, discontinuously. Even substantial improvements in transducer technology cannot provide tens or hundreds of milliwatts of power to the applied circuitry and larger transducers are impractical and expensive to integrate into small devices. To successfully use small energy transducers as a power source for small devices, high demands are made on the power management. Improvement in power management can substantially increase the area of application and new application fields can be developed.

One application 135 is a "floating tank level switch" which draws an average operating current of less than less than 5 microamps, requires no battery and is completely energy-autarkic. The micro-energy harvesting system 100 can be scaled up or down by using larger or smaller coupled inductors and capacitors to exactly meet other application requirements. The presented micro-energy harvester 115 can be used in other applications such as: pilot supplies to start-up a more efficient DC-DC converter; distributed power; long live remote devices; keep-alive circuits; light switches, provided sufficient light is available (direct sun light is not required); status monitors for tilt, position, level, rotation, speed, movement; warning devices for fire, smoke, gas, water, radiation, wind, entry, occupancy, health; security devices; door bells and locks; environmental data collectors; and ultra-low-power industrial monitoring devices.

Figure 2:
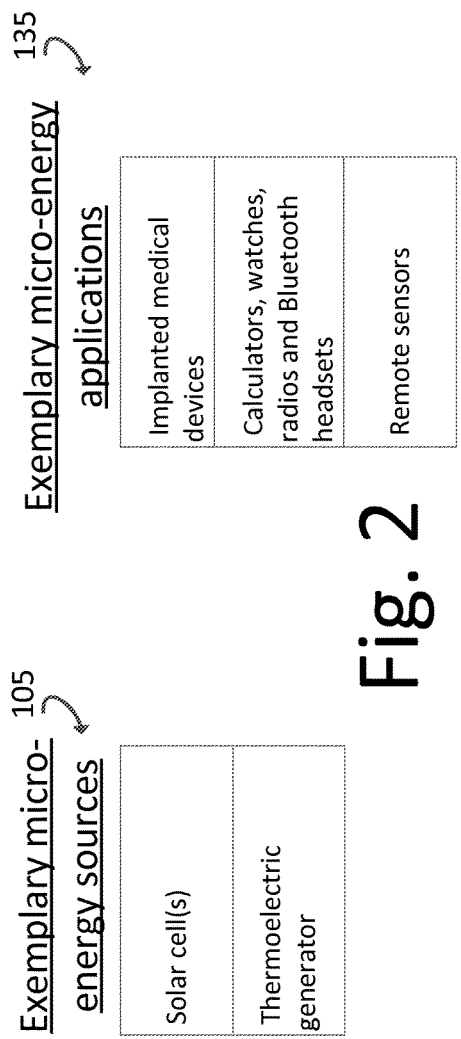
FIG. 2 illustrates a small sample of exemplary micro-energy sources and micro-energy applications of the system according to an embodiment of the invention.

FIG. 2 illustrates a small sample of exemplary micro-energy sources 105 and micro-energy applications 135 of the system 100 according to an embodiment of the invention. In a preferred embodiment, the micro-energy source 105 is one or two solar cells. In another embodiment, the micro-energy source includes a thermoelectric generator (e.g., thermoelectric arrays) like used with conventional micro-energy harvesters.

Micro-energy applications 135 are devices which do not require constant power, such as implanted medical devices, calculators, watches, radios, bluetooth headsets, and some more power hungry applications on the cusp of being powered, such as remote sensors.

FIG. 3 illustrates a more detailed view of the system 100 according to an embodiment of the invention including new components 340-370. This more detailed view is referred to as a system 300, where the system 300 and components 305-335 can be similar to the system 100 and components 105-135. Like the system 100, the system 300 builds up DC-to-DC power from a low voltage input source 105 without a continuous power source.

FIG. 3 shows the block diagram for the solar micro-energy harvesting system 300. The system 300 includes a micro-energy source 305, an input 310 into a micro-energy harvester 315 having a resonant DC-to-DC converter 320 and a power manager 325, an output 330 to a micro-energy application 335, a photovoltaic cell 340, a self-starting oscillator 345, a power supervisor 350, a storage capacitor 355, a shunt regulator 360; a post regulator 365, and an application circuit 370.

The micro-energy source 105 includes small solar cells and other environmental low energy DC power generators. Micro-energy sources generate a low DC voltage from a low level of light, such as the light from a candle.

In one embodiment, the micro-energy harvester 315 has a working range between 60 mV and 500 mV, which means the micro-energy harvester 315 works for start-up voltages as low as 60 mV in this embodiment as a threshold minimum voltage. The micro-energy harvester remains off until it reaches the threshold minimum voltage, over a period of time, and then switches on. This allows the micro-energy harvester to start up at very low power and therefore use extremely weak power sources (e.g., 100 nanowatts with about 60 millivolts and 2 3 microamps). Although different devices will vary, for example, a typical conventional micro-energy harvester might start up about 80 microwatts with about 20 mW and 4 mA, which is 1000 times higher start up power required due to the high current required.

The micro-energy harvester 315 can have the capabilities of a voltage converter, a power converter, a DC-DC converter, and resonant converter. The micro-energy harvester 315 is designed to receive a DC voltage, and typically a low DC voltage since the micro-energy harvester would not be needed if the power source was greater than a volt such that it could turn on a 0.8 volt turn on transistor. The transistor in the micro-energy harvester 115 is normally off, such that with 0 volts at the gate of the transistor, the transistor is off. The transistor's drain to source resistance is high but a small leakage current remains, which is enough to initiate oscillation. With every cycle of oscillation the gate voltage increases and eventually turns the transistor on completely. This behavior guarantees a soft start-up compared to a conventional J-FET design which is fully on at start-up, thus drawing high start-up current and collapsing the source voltage.

The self-starting resonant DC-to-DC converter 320 increases the input voltage to a workable level. The self-starting resonant DC-to-DC voltage converter presented does not require a separate operating voltage and charges any size of storage capacitor, even if such capacitor is completely discharged without a current limiting device. A completely discharged supercapacitor presents a short circuit at the harvester output. Conventional harvesters cannot charge a super capacitor directly without a charge current limiter. The presented harvester overcomes such limitation and can start up even into a fully discharged storage capacitor. The resonant DC-to-DC converter 320 starts up by itself, meaning it does not need to be switched on, and starts up with very low voltages (e.g., 60 millivolts). Since the oscillator operates at 60 mV and below, it can oscillate behind the output rectifier diodes not seeing an empty storage capacitor until the schottky diode threshold is reached. At this point the harvester is slowly charging the storage capacitor until the cutoff voltage is reached at 5.2 volt.

The power manager 325 is illustrated including the power supervisor 350, the storage super capacitor 355, the shunt regulator 360, and the post regulator 365. The power supervisor 350 lets the application circuit know if the storage capacitor 355 is sufficiently charged, too low, and whether the charge is sufficient to operate the radio or any other high power demanding task. If the storage capacitors voltage is too low to operate high power tasks, such as a radio transmission, the task will be discontinued until enough power is available again.

Energy harvesting applications 335 have attracted much interest in both the military and commercial sectors. Some applications 335 convert motion, such as that of ocean waves, into electricity to be used by oceanographic monitoring sensors for autonomous operation. Future applications 335 may include high power output devices (or arrays of such devices) deployed at remote locations to serve as reliable power stations for large systems. Another application is in wearable electronics.

The system 300 is now discussed in view of the remaining seven blocks (340-370) not illustrated in the previous figures: the photovoltaic cell 340; the self-starting oscillator 345; the power supervisor 350; the storage capacitor 355; the shunt regulator 360; the low dropout regulator (LDO) 365; and the application circuit 370. Each of these blocks has its own distinct function in the harvesting system.

As an introduction to these blocks, they may have the following dimensions: the photovoltaic cell 340 of a micro-energy source 305 has a minimum surface area of 1.3 $cm^2$; the self-starting oscillator 345 of the micro-energy harvester 315 has a minimum start-up voltage of 60 mV; the power supervisor 350 of the power manager 325 provides early warnings (—under voltage warning—UVW) for a low power condition and an under voltage lockout (UVLO) in case operation can no longer be sustained; the storage capacitor 355 of the power manager 325 has a capacity of 1 Farad; the shunt regulator 360 of the power manager 325 has a programmable cutoff voltage to accommodate different storage devices such as Supercapacitors and Rechargeable Micro-Batteries and to burn off unused energy; the low dropout regulator (LDO) 365 or other post regulator of the power manager 325; and the application circuit 370 of the micro-energy application 335 which receive a constant voltage from the power manager 325.

Starting with the first of seven blocks, the photovoltaic cell 340 can be the micro-energy source 305. The photovoltaic cell 340 generates a low DC power. The harvester 315 works for voltages as low as 60 millivolts which includes that of the photovoltaic cell 340. The micro-energy source 105 can be solar power, which converts sunlight into electricity. A typical way of converting radiation energy (sunlight) into electrical energy is through photocells (solar cells). In other words, photocells convert light into electric current using the photovoltaic effect.

Moving on to the second block, the self starting oscillator 345 utilizes a transistor (e.g., an Enhancement Mode Pseudomorphic High Electron Mobility Transistor) as the switching device to form a resonant step-up oscillator using a coupled inductor, and a resistor and capacitor in parallel at the gate of the transistor. The harvester 315 uses the drain to source leakage current of the pass transistor type (PHEMT) to initiate oscillation at low (30 mV) gate voltage.

For the startup, the small gate voltage from the solar cell (still below the threshold voltage of the transistor) increases the conductance of the transistor and therefore the current through the coupled inductor. The small current through the primary side of the inductor develops a magnetic field which induces a voltage into the secondary side of the inductor. The voltage is positive and is coupled through a capacitor together with the solar cell voltage onto the gate of the transistor. If the solar cell voltage increases to approximately 50 mV, the induced voltage together with the solar cell voltage is high enough to turn on the transistor and start oscillation.

The self starting oscillator 345 does not require a foreign power source (e.g., battery) to force the transistor to switch on and off like in a regular DC-to-DC converter, which requires another voltage in the form of a battery or another foreign voltage source. As such, the micro-energy harvester 315 can be referred to as a "self-starting resonant" DC-to-DC converter because, unlike the regular DC-to-DC converter, the micro-energy harvester 315 is not forced to switch. A solar cell is not considered a battery source because the cell voltage provided is not sufficiently high enough to power electronic circuitry without transformation.

The self-starting oscillator's ability to work with a single solar cell is a big advantage of the present invention since small single solar cells provide not much power at low light levels. In other embodiments, the micro-energy harvester 315 can also work with a thermoelectric generator. Thermoelectric generators deliver higher currents but have significantly lower output voltages (20 mV and lower at small temperature differences). For example, an energy harvester for a thermoelectric generator must start at 10 to 15 millivolts, as opposed to 60 millivolts for a single solar cell at low light conditions.

The power supervisor 350 utilizes a dual comparator to manage power usage from the storage device. Two voltage thresholds—Under Voltage Warning (UVW) and Under Voltage Lock-Out (UVLO) indicate the state of charge from the energy storage device. An under voltage warning indicates to the application circuit that tasks which require burst currents should no longer be executed and that if the warning persists the application will be cut off power. If the supply voltage Vstore into the shunt regulator 360 further decreases and UVLO triggers, the low-dropout voltage regulator will be disabled to prevent the application from entering an undefined state and protect the storage device from further discharge.

Next, the storage capacitor 355 is used to provide a constant supply of energy to the application circuit during periods where the harvester cannot supply (night time) or cannot supply sufficient energy to the application circuit. The storage device is also able to supply high burst currents (35 milliamp max) for short periods of time, which can be used to radio short packets of data to a parent receiver. The size of capacitor in parallel with the storage capacitor determines the duration and value of such current bursts.

The shunt regulator 360 utilizes a comparator to prevent storage devices getting overcharged. The shunt regulator shunts away excess energy which cannot be stored or used up by the application circuit, thus protecting the storage device from getting overcharged or damaged.

The post regulator 365 provides a constant voltage supply to the application circuit.

The application circuit 370 can monitor a tank level (water or other liquids) and remotely controls a pump within distances of less than 500 meters. It does so without batteries, being powered by two small solar cells for a long time. The entire chip can be a complete tank level transceiver including radio, micro-energy harvester, energy storage tank and MCU (Microcontroller).

FIG. 4 illustrates exemplary circuitry of the system 100 according to an embodiment of the invention. This exemplary circuitry view is referred to as a system 400, where the system 400 and components 405-470 can be similar to the system 300 and components 305-370. The exemplary circuit includes a micro-energy source 405, an input 410 into a micro-energy harvester 415, a power manager 425, an output 430 into a micro-energy application 435, a photovoltaic cell 440, a self-starting oscillator 445, a power supervisor 450, a storage capacitor 455, a shunt regulator 460, a post regulator 465, and a wireless transceiver 470.

The illustrated micro-energy source 405 is two solar cells. Alternatively, one solar cell could have been used. The solar cell can be a photovoltaic cell. A big advantage of the present invention is that the micro-energy harvester 415 works with a low input powered solar cell, whereas conventional micro-energy harvester require a thermoelectric generator. For the thermoelectric generator embodiment, the two photovoltaic cells are replaced by a thermoelectric generator. The energy source 405 for the circuit is two identical in parallel connected mono-crystalline solar cells (the components with double arrows pointing to them) with a cell efficiency of 22%. The open circuit voltage of the cell is 630 mV with a typical current at 1 sun (100 mW/sq. cm) of 40 milliamps. The combined surface area of the two cells is 2.6 square centimeters. The positive terminals of the cells are connected to two coupled inductors. The negative terminals of the cells are connected to a transistor, where the transistor's source terminal S is connected to ground GND. The capacitor in parallel with solar cells provides a buffer for short higher current demands from the circuit at low light levels. For indoor use, photovoltaic cells, which have better spectral conversion efficiency for light emitted by fluorescent lighting, can be used.

The micro-energy harvester 415 includes the resonant DC-to-DC converter 420 which includes inductors in series with a normally off transistor. The micro-energy harvester 415 provides one way to work with very low power input sources and built up power at a high efficiency.

The self-starting oscillator 445 utilizes a transistor. In one embodiment, the transistor is an E-PHEMT (Enhancement Mode Pseudomorphic High Electron Mobility Transistor) transistor, as the switching device to form a resonant step-up oscillator using a coupled inductor (the left and right inductors, ratio 1:1, 1 mH) and a resistor and capacitor in parallel at transistor's gate. The self-starting oscillator 445 is in series with the inductors. The transistor is normally off at zero gate voltage which would be the case with the two solar cells in complete darkness. The transistor's threshold voltage is very low and has a value greater than 110 millivolts.

The E-PHEMT transistor 445 can be described as having the combined characteristics of a FET (Field Effect Transistor) and BJT (Bipolar Junction Transistor) and is used primarily for high-speed RF amplifiers in cell phones or other communication gear, but it is also an excellent candidate for low voltage self-starting oscillators like the oscillator 445.

The self-starting requirement of a conventional harvester circuit demands a "normally-on" device since no output can be expected without a current flowing at the beginning. The solution illustrated in FIG. 4 uses a transistor that does partially violate this demand, but the circuit configuration in FIG. 4 allows a start-up voltage of 60 millivolts which is still significantly below the transistors minimum threshold voltage of greater than 110 millivolts.

The small drain leakage current of the transistor promotes start-up, but the main reason for this circuit to start oscillation is a small increase in conductance of the transistor with a rising gate voltage, where the input resistor in the micro-energy harvester 415 provides bias to the transistors gate from the source voltage PV+.

As soon as the source voltage PV+ (the voltage from the solar cell) starts approaching the starting threshold of 60 millivolts, the transistors drain source path conductance increases, which causes a small current to flow from ground GND through the transistor and the inductor on the left to PV+.

The small current through the inductor on the left develops a magnetic field which induces a voltage into the inductor on the right. The voltage is positive at the right inductor's bottom terminal. The capacitor in parallel with the resistor couples this positive signal (the sum, of the voltage across right inductor plus the source voltage PV+) to the gate G of the transistor. Now, with a higher gate voltage the transistor conducts harder. With the transistor conducting harder, more current flows through the left inductor, a larger voltage is induced into the right inductor, and a larger positive signal is coupled back to the gate of the transistor through the capacitor that is in parallel with the resistor.

The transistor will continue to increase in conduction until it reaches a maximum. At maximum conduction, the current through the left inductor is also at maximum value and cannot increase any further. With a steady current through the left inductor, the magnetic fields are not moving and the voltage at the right inductor drops.

As the voltage across the right inductor drops, the capacitor in parallel with the resistor is discharged primarily through the resistor in parallel and the gate voltage at transistor is decreasing. Therefore, quickly cutting off the drain current of the transistor and the collapsing magnetic field of the left inductor induces a large negative voltage in the right inductor, which is coupled through the capacitor in parallel with the resistor to the gate of the transistor and makes the gate of the transistor more negative.

The transistor is now cutoff and the current through the left inductor approaches zero, the negative voltage across the right inductor decreases, the capacitor in parallel with the resistor is discharged by this resistor and the gate voltage at the transistor approaches the source voltage level of PV+, and the cycle starts over.

Tests have shown that the waveform on the node above the parallel resistor and capacitor has a very short off cycle of the transistor and a high negative voltage induced during this time interval.

Energy stored in the right inductor is coupled out through a series capacitor which forms together with the dual Schottky diodes the Voltage Shifter, converting the negative output voltage from the oscillator into a positive voltage. The output of the top diode directly feeds the storage device which can be a capacitor, a supercapacitor or a microbattery. In case the oscillator output voltage falls below the supply voltage Vstore, the diodes prevent the storage device from discharging into the oscillator circuit with a remaining reverse leakage current of less than 40 nanoamps.

The power manager 425 is illustrated as including the power supervisor 450, the storage super capacitor 455, the shunt regulator 460, and the post regulator 465. The power supervisor 450 monitors the energy at the super capacitor, and if too low, can provide external power in some embodiments. The storage super capacitor 455 is large enough (e.g., 1 farad) to build up energy and supply to a micro-energy applications such as the wireless transceiver 470. The shunt regulator 460 works by providing a path from the supply voltage to ground through a variable resistance. The post regulator 465 switches between the micro-energy power and the external power.

The power supervisor 450 utilizes a dual comparator to manage power usage from the storage device. Two voltage thresholds—Under Voltage Warning (UVW) and Under Voltage Lock-Out (UVLO) indicate the state of charge from the energy storage device. An under voltage warning indicates to the application circuit that tasks which require burst currents should no longer be executed and that if the warning persists the application will be cut off power. If the supply voltage Vstore further decreases and UVLO triggers, the low-dropout voltage regulator will be disabled to prevent the application from entering an undefined state and protect the storage device from further discharge. The power supervisor's terminals S0, S1, S2 are used to program different thresholds for UVW and UVLO. The power supervisor is powered by the supply voltage Vstore and draws a maximum operating current of 500 nanoamps.

The storage super capacitor 455 was chosen as a storage device because of its long cycle life in comparison with microbatteries cycle life. Under normal operating conditions the supercapacitor is cycled ones per day with a discharge threshold of 3 Volts. This, together with the supercapacitors long cycle life provides for a very long maintenance-free operating time of the system. The supercapacitors leakage current, which is in average ten times larger than the leakage current of a lithium-ion battery has to be accounted for in the system design.

The shunt regulator 460 utilizes a comparator to prevent storage devices getting overcharged. The shunt regulator shunts away excess energy which cannot be stored or used up by the application circuit, thus protecting the storage device from getting overcharged or damaged. A wide range of float voltages (the voltage where charging has to stop) can be programmed through the resistance ratio of the two resistors at the comparator's input. Float voltages for the shunt regulator can be set from 2 to 5.5 volts. The shunt resistor 460 is where all excess energy from the oscillator is burned off. The shunt regulator 460 is supplied by Vstore and draws a maximum supply current of 800 nanoamps at 5.5 volts.

The post regulator is illustrated as a low dropout regulator (LDO) 465 for Vstore (the input voltage into the shunt regulator) to provide a constant voltage supply to the application circuit. The LDO has a fixed output voltage of 2.7 volts, which is the supply voltage for a battery free tank level transceiver application. The operating current for the regulator with 500 nanoamps is very low and compensates for the lower efficiency achieved, compared to a step-down DC-DC converter. The use of a DC-DC step-down-up converter was not considered in this specific embodiment because of their high operating currents and price, but it could also be utilized in another embodiment.

The micro-energy application 435 can be a wireless transceiver such as a battery-free tank level transceiver. The system 400 draws very low average operating current from a storage device (less than 2 microamps) and presents a simple and cost-effective solution which is easy to integrate into extreme low power application designs. A small form factor and low cost can be further optimized by customizing components such as the coupled inductor. The small form factor and the use of very small mono-crystalline solar cells together with the capability of cascading the modules make it a complete unique solution which includes, a solar cell, a step-up converter, a charging circuit for energy storage devices, a storage device (supercapacitor or rechargeable microbattery) a power manager and a post regulator.

A micro-energy application 435 can be a wireless transceiver. The micro-energy harvesting system 400 can be integrated into an application circuit. The application circuit can monitor a tank level (water or other liquids) and remotely controls a pump within distances of less than 500 meters. It does so without batteries, being powered by two small solar cells for a long time. The entire chip can be a complete tank level transceiver including radio, micro-energy harvester, energy storage tank and MCU (Microcontroller). A simple magnetic ball level has been designed to serve as the level detector in the tank. The ball level is floating on the liquid in the tank and is activated at a certain tilt angle which opens or closes a built-in reed contact. The microcontroller in the circuit wakes up every second to monitor the float and goes back to sleep after completing its tasks. If the floating switch changes state, a short data packet is radioed to the pump receiver to switch it on or off. The complete circuit consumes 4 microamps at 2.4 volts average current if the pump is activated every 20 minutes. The device is battery-free and maintenance-free and does not require a power cable from the tank to the pump.

Although the circuitry in the system 400 illustrates one embodiment, several advantageous modifications can be performed. In another embodiment only one solar cell is used as opposed to two at the photovoltaic cells 440 at the input micro-energy source 405. In a further embodiment, the output capacitor of the micro-energy harvester is connected to a second ground, and an additional diode is connected between the second ground and the node that connects with the top of the resistor in the micro-energy harvester 415. This doubles the output voltage and halves the charges current to the output capacitor of the micro-energy harvester 415.

In another embodiment, another transducer is connected to the transistor of the micro-energy harvester 415 such that the supply, gate, and drain of the illustrated transistor connect to the supply, gate, and drain, respectively of the additional transistor. The additional transducer, with the inductor having a larger size, minimizes the DC path resistance increasing output current capabilities. In a further embodiment, one or more additional micro-energy harvesters are connected in parallel with the micro-energy harvester 415, all of which outputting to the power manager 425. This configuration can be used to increase either the output voltage or output current. Tests have proven the cascading just four harvesters can accumulate energy indoors even under weak artificial illumination. Tests have shown that outdoors up to 200 volts of output voltage were achieved by connecting ten of the micro-energy harvesters 415 illustrated in the system 400.

It is understood that, with the exception of charge pumps, all DC-DC converters are based on switching a current through an inductor. The main consideration in the micro-energy harvester 415 presented includes the kind of switching device used for the self-starting oscillator 445.

Resonant self-starting low voltage oscillator designs vary little in their basic circuit topology and many different designs exist. Most designs are modified Armstrong oscillators, but also Hartley and Colpitts oscillators are used. These oscillators are sinusoidal oscillators and have very low efficiency (less than 10%) when used in a step-up configuration and require a high operating voltage. Their main purpose is to provide a sinusoidal waveform stable in frequency and amplitude. Modifying an Armstrong oscillator, as shown in FIG. 4, converts the Armstrong design into a resonant self-starting DC-DC converter, with no distinct tank-capacitor performing like a duty cycle controlled on/off switch.

The challenge to design an energy-autarkic electronic system is, to lower the systems quiescent and operating currents to very low levels while maintaining all necessary functions in components 440-470.

Bipolar junction transistors need a voltage of about 0.7V to switch on which makes them not suitable in a self-starting converter operating at less than 0.1V. Although the threshold voltages of semiconductors are scaled down due to technology development, there is still a gap between the output of the energy transducers and the minimum required input voltage of state-of-the-art voltage converters like DC-DC boost converters.

As mentioned above, the self-starting requirement of a conventional harvester circuit demands a "normally-on" device since no output can be expected without a current flowing at the beginning. The drawback of a normally-on device besides their relative high on-resistance is, that at the beginning (before oscillation starts) current flows from the transducer (small solar cell) to ground collapsing the source voltage considerably at low light levels, making a self-start more difficult or impossible.

Another limiting factor of a low energy harvesting system is the leakage current of the storage device which is used to supply energy to the application during periods when the ambient source cannot. The leakage current (self-discharge) of a supercapacitor is 10 to 50 times higher than the leakage current of a rechargeable lithium-ion microbattery. The leakage current of the conventional supercapacitor is twice as high as the devices average operating current of 4 microamps. This is currently the main limiting factor for micro-energy harvesting systems with Supercapacitors. It is possible to decrease the operating currents of electronic devices even further. But it doesn't seem to be possible to significantly decrease self-discharge in storage devices such as supercapacitors, which means, that supercapacitors are not suitable for long time storage in micro-energy harvesting systems, unless the ambient energy source is able to deliver more than the storage device leaks away.

The resonant self-starting micro-energy harvester 415 addresses the above indicated design challenges and meets the following design criteria: device shall operate under harsh outdoor conditions; power management circuit and application circuit must operate energy-autarkic and shall be powered in the absence of light by a Supercapacitor or Rechargeable Micro-Battery; Capacity: 500 mF to 1F; use of single Photovoltaic Cells: Minimum Surface Area: 19×7 mm/1.3 cm2, Maximum Output Voltage at no load: 650 mV; oscillator must start-up with initially no current flowing into a short circuit in case of an empty storage capacitor; oscillator must not load high impedance energy sources such as small solar cells at low light levels or galvanic cells at start-up to avoid collapsing their open circuit voltage; minimum Start-up Voltage: 60 mV; maximum Operating Voltage: 800 mV; minimum Start-up Power: 100 nW; minimum Output Voltage at 60 mV Input Voltage: 1V; maximum Output Voltage at 500 mV Input Voltage: 15V (at no load); maximum Output Current at 450 mV Input Voltage and 10V Output Voltage: 1.5 mA; efficiency at low Input Voltage (60 mV) better than 40%; efficiency at higher input voltages>150 mV better than 60%.

Additional features of the present invention include: Complete micro-power harvesting solution for intermittent duty cycle applications utilizing a Solar Cell, Voltage Booster, Storage Device, Charger, Output Voltage Conditioner and Power Manager; Very small footprint and volume less than ¼ cu. inch (less than ⅛ cu. inch with "CYMBET" solid state batteries; Energy capture, storage and power management from intermittent energy sources such as solar, thermal, chemical, biological mechanical and human or animal body sources; Very low total component count (18); Compatible with a wide range of voltage sources and impedances (60 mV-600 mV, 100Ω-10kΩ); Self-starting with very low start-up voltage, current and power 60 mV/2uA/120 nW; High efficiency 40% to 65% depending on input voltage, current and energy source impedance; Start-up into a short circuit, no additional charge circuit required for Supercaps and Rechargeable Micro-Batteries; complete solution for low duty-cycle metering, control and wireless sensing networks; adaptable for use with a broad range of applications; no calibration or setup required; maintenance free operation; very long operating life; ideal for extreme life span micro-power-sources; virtually unlimited operating cycles if used with Supercaps; can be hermetically sealed (no moving parts); contains no hazardous materials when used with Supercaps or Rechargeable Solid State Batteries; and RoHS compliant.

Figure 5:
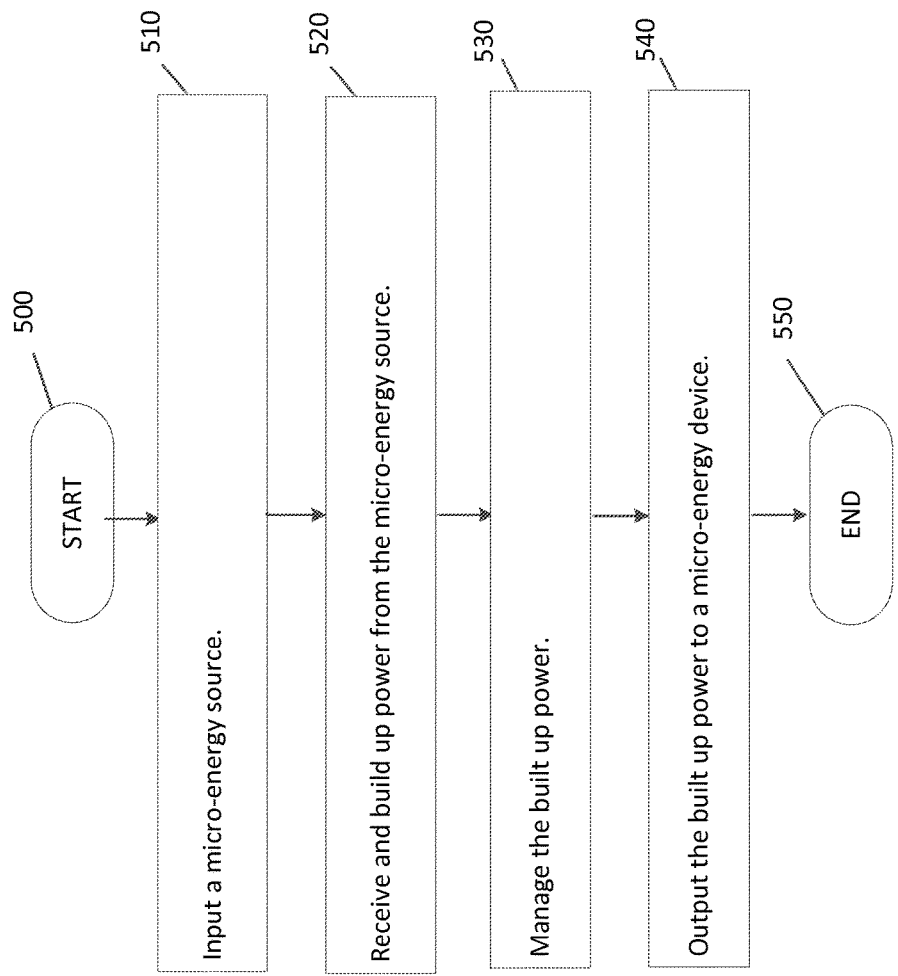
FIG. 5 illustrates the process of building up a low voltage micro-energy source input according to an embodiment of the invention.

FIG. 5 illustrates the process of building up a low voltage micro-energy source input according to an embodiment of the invention. The process starts at step 500. At step 510, the micro-energy source 105 inputs power into the micro-energy harvester 115. Multiple types of micro-energy sources 105 can be used, although a big advantage of the present invention is that it works with a low powered solar cell. At step 520, the micro-energy harvester 115 receives and builds up power from the micro-energy source 105. The micro-energy harvester uses a normally off transistor that allows for a lower on resistance when turned on improving efficiency.

At step 530, the power manager 125 manages the built up power. The power is stored in a super capacitor. In some embodiments, a post regulator switches between the micro-energy power and an external power source based on a power supervisor. At step 540, post regulator of the power manager 125 outputs power for the micro-energy application 135. The process may be repeated recursively a number of times and ends at step 550.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multithreaded processing, interrupt processing, or multiple processors, rather than sequentially.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. A device comprising:
    an input configured to receive a micro-energy source having an input direct current (DC) voltage, wherein the micro-energy source comprises input power on the order of microwatts or less and is a non-continuous power source;
    a micro-energy harvester comprising an oscillator, wherein the micro-energy harvester receives and builds up the input DC voltage over time to an output DC voltage, wherein the oscillator comprises a transistor that is normally off and the transistor is switched on by the micro-energy source;
    an inductor attached to an input of the transistor that is normally off, the inductor bringing a voltage at the input of the transistor to a threshold voltage that turns the transistor on;
    wherein the transistor is a field-effect transistor (FET) with a source, a gate, and a drain, the transistor having a drain to source leakage current with a gate voltage of zero representing no voltage from the gate to the source, the leakage current coupled to the gate and fed into the gate through the inductor to initiate oscillation at startup, with every cycle of oscillation the gate voltage increases until the transistor turns on; and
    an output configured to provide the output DC voltage to a micro-energy application is a duty cycle device that does not require continuous power.

2. The device of claim 1, wherein the micro-energy harvester further comprises a power manager, wherein the power manager measures a power level.

3. The device of claim 1, wherein the micro-energy harvester comprises a resonant DC-to-DC voltage converter.

4. The device of claim 1, wherein the micro-energy harvester is not powered by a battery.

5. The device of claim 1, wherein the micro-energy source comprises a solar cell.

6. The device of claim 1, wherein the micro-energy source comprises a thermoelectric generator.

7. A system comprising:
    a micro-energy source having an input direct current (DC) voltage;
    a micro-energy harvester comprising an oscillator, wherein the micro-energy harvester receives and builds up the input DC voltage to an output DC voltage, wherein the oscillator comprises a transistor that is configured to be normally off and the transistor is configured to be switched on by the micro-energy source;
    wherein the transistor comprises a source, a gate, and a drain, and the transistor comprises a drain to source leakage current coupled to the gate through an inductor to initiate oscillation at startup; and
    a micro-energy application configured to receive the output DC voltage.

8. The system of claim 7, wherein the micro-energy harvester further comprises a power manager, wherein the power manager measures a power level.

9. The system of claim 7, wherein the micro-energy harvester comprises a resonant DC-to-DC voltage converter.

10. The system of claim 7, wherein the micro-energy harvester is not powered by a battery.

11. The system of claim 7, wherein the micro-energy source comprises a solar cell.

12. The system of claim 7, wherein the micro-energy source comprises a thermoelectric generator.

13. The device of claim 1, wherein the micro-energy source comprises an input power range of nanowatts, microwatts, or milliwatts.

14. The device of claim 13, wherein the input power range comprises one of: 1 microwatt to 15 milliwatts for light; 1-200 microwatts for vibrations; approximately 15 microwatts for thermal, or approximately 100 nanowatts.

15. The device of claim 13, wherein the input power range comprises approximately 80 microwatts.

16. The device of claim 1, wherein the transistor comprises an enhancement mode FET or an Enhancement Mode Pseudomorphic High Electron Mobility Transistor (E-PHEMT).

* * * * *